Feb. 23, 1960     A. C. WINTEMBERG     2,925,789
RAILWAY VEHICLE STRUCTURE
Filed May 4, 1956                              2 Sheets-Sheet 1
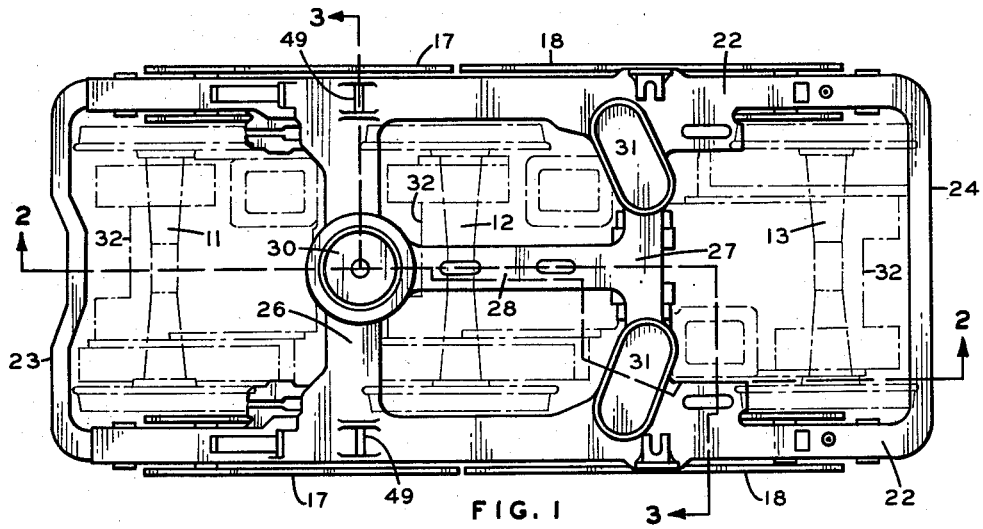
FIG. 1
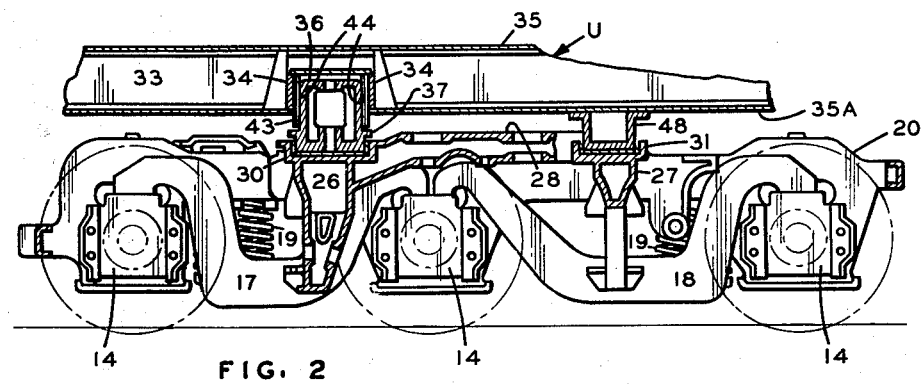
FIG. 2
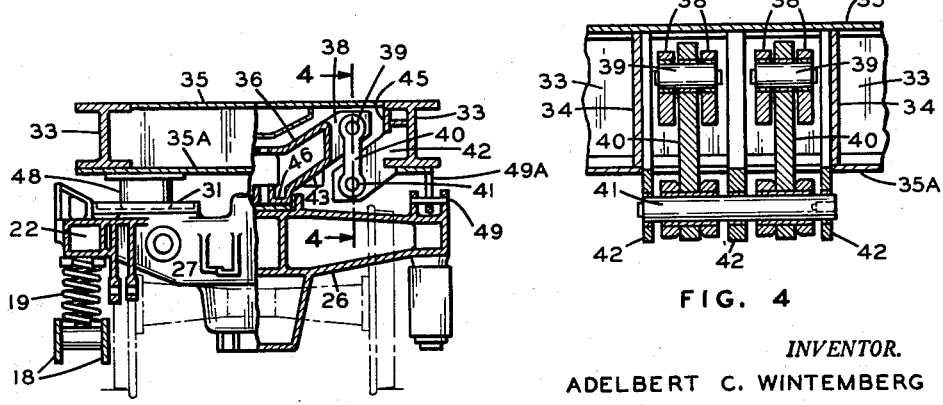
FIG. 3                          FIG. 4
INVENTOR.
ADELBERT C. WINTEMBERG
BY
Francis T. Burgess
ATTORNEY Feb. 23, 1960     A. C. WINTEMBERG     2,925,789

RAILWAY VEHICLE STRUCTURE

Filed May 4, 1956                                      2 Sheets-Sheet 2

*INVENTOR.*
ADELBERT C. WINTEMBERG
BY
ATTORNEY

United States Patent Office 2,925,789
Patented Feb. 23, 1960

2,925,789

RAILWAY VEHICLE STRUCTURE

Adelbert C. Wintemberg, Drexel Hill, Pa., assignor to General Steel Castings Corporation, Granite City, Ill., a corporation of Delaware Application May 4, 1956, Serial No. 582,789

3 Claims. (Cl. 105—188)

The invention relates to railway rolling stock and in particular to means associated with a railway vehicle underframe for accommodating lateral motion between the underframe and the trucks.

In diesel electric locomotives, space limitations on the locomotive underframe frequently require the use of relatively short wheel base trucks, while at the same time other factors including track conditions and power requirements make desirable the use of six wheel trucks provided with a separate motor for each wheel and axle assembly. Because of the large amount of equipment carried by the superstructure it is generally desirable that the height of the underframe from the rail be kept as low as possible. It is also of utmost importance that the weight of the locomotive be distributed uniformly to each of the wheels. These problems have all been solved by me and Thomas R. Gilchrist in a truck structure described and claimed in our co-pending application, Serial No. 246,784, filed September 15, 1951, now abandoned. The structure disclosed therein comprises a unitary truck frame, spring-supported through equalizers on three wheel and axle assemblies. To provide adequate clearance above the intermediate axle for the motor associated therewith, the truck center plate is displaced from the usual position above the intermediate axle toward one end of the truck, and to distribute part of the body load to the other end of the truck and to provide adequate lateral stability, a pair of laterally spaced loading pads are located on the truck frame between the middle and the opposite end wheel and axle assembly. To provide adequate space longitudinally of the truck for the motors, and at the same time minimize the wheelbase, as well as to simplify the load distribution problem, the center plate and loading pads are made rigid with the truck frame. For ensuring constantly uniform weight distribution, a non-yielding body center plate and a pair of laterally spaced, non-yielding load supports are provided on the locomotive underframe for pivotal and sliding engagement, respectively, with the truck center plate and loading pads.

Trucks of this type are very satisfactory at speeds up to and including 60 miles per hour, but at higher speeds, they are not generally satisfactory due to the absence of provision for lateral motion of the body relative to the truck. In conventional trucks used in high speed service lateral motion bolsters carrying the truck center plate and side bearings are suspended from the truck frame by means of swing hangers, frequently with a spring plank and bolster springs interposed, but in some cases directly. In any event, the provision of a swing motion truck bolster requires considerable longitudinal space in the truck frame to accommodate the swing hangers and additional transom structure. This requires a longer wheel-base, which, as indicated above, is sometimes not feasible.

It is a principal object of the invention to provide, in a locomotive and truck arrangement, means for accommodating relative lateral motion between the locomotive body and trucks while at the same time retaining the short wheel-base and uniform weight distribution features of the truck referred to above.

A more detailed object is to achieve the principal object by providing a swing motion bolster associated with the locomotive underframe rather than with the truck.

An additional object is to provide a truck and body arrangement of the type described above wherein lateral movements of the body are accommodated partly by a body-associated swing motion bolster engaging the truck center-plate, and partly by sliding of the body on the loading pads, and at the same time to provide means for causing each of the three body and truck load supports to remain constantly in full engagement regardless of lateral displacement of the body. In this connection, it is evident that in the absence of such means, the tilting of the bolster which occurs when the usual swing motion bolster moves laterally would result in an angular opening between the opposing horizontal faces of the center plate, because of the parallelism maintained between the underframe and truck frame by the loading pads and associated body supports.

These objects are attained by supporting the underframe by swing hangers from a bolster supported on the truck center plate. To prevent partial separation between cooperating truck and underframe portions of any of the load supports, in the preferred form of my invention I support the underframe from the bolster by means of normally vertical swing hangers and provide a cylindrical center plate and non-yielding load supports. The vertical swing hangers cause the bolster to remain parallel to the underframe at all times, instead of tilting during lateral displacement of the underframe, and accordingly there is no tendency on the part of the bolster and truck center plate portions to become separated.

In another form of my invention I utilize normally inclined swing hangers, non-yielding load supports and a spherical center plate to accommodate tilting of the bolster without separation between the bolster and truck center plates.

In a third embodiment I similarly provide inclined swing hangers, but utilize the usual cylindrical center plate and yieldable load supports wtih spherical bearings, non-parallelism between the truck and underframe resulting from tilting of the bolster being accommodated in the springs and spherical bearings of the load supports.

In a fourth form of the invention I provide inclined swing hangers and non-yielding load-supports, but include a relatively thick rubber pad between the bolster and truck portions of the cylindrical center plate to accommodate, through yielding in compression, tilting of the bolster during its lateral movements.

The foregoing and other more detailed objects as will appear below are attained by the structures illustrated in the accompanying drawings in which:

Figure 1 is a top view of a six wheel truck with three load-supporting elements.

Figure 2 is a longitudinal vertical section taken approximately along the line 2—2 of Figure 1, and also showing a portion of the vehicle underframe.

Figure 3 is a transverse vertical section taken approximately on the line 3—3 of Figure 1.

Figure 4 is a longitudinal vertical section taken on the line 4—4 of Figure 3.

Figure 5:
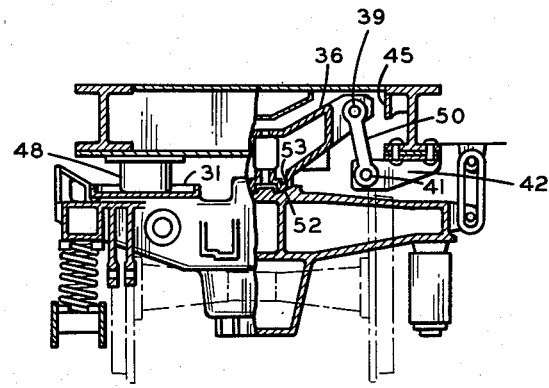
Figure 5 is a transverse vertical section taken approximately on the line 3—3 of Figure 1, but illustrating a second embodiment of the invention.
Figure 9:
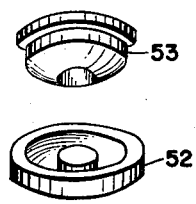
Figure 9 is a perspective view of the spherical center plates shown in transverse vertical section in Figure 5.

The truck includes three wheel and axle assemblies, 11, 12 and 13, each having a pair of journal boxes 14. Pairs of equalizer bars 17 and 18 extend between each journal box of the middle assembly 12 and the journal boxes of the end assemblies 11 and 13. Coil springs 19 seated on equalizer bars 17 and 18 resiliently support truck frame 20. Truck frame 20 includes wheel pieces 22, end transoms 23 and 24, intermediate transoms 26 and 27, and a central longitudinal member 28.

Three load-supporting bearings including cylindrical center plate 30 on transom 26, and laterally spaced and elongated horizontal loading pads 31 on transom 27, are provided for supporting the vehicle under frame U on the truck. Center plate 30 is located on the longitudinal centerline of the truck at the intersection of transom 26 and longitudinal member 28, and the loading pads 31 are located, respectively, at the opposite end portions of transom 27. The loading pads are elongated in a direction generally transversely of the truck, with their major axes tangent to an arc having the center plate as its center. All three load supports form rigid parts of the truck frame. Motor and gear box assemblies 32 are associated with and supported in part by each axle and in part by brackets on adjacent intermediate transoms.

Locomotive underframe U includes a pair of laterally spaced longitudinally extending I-section sills 33 connected at intervals by transversely extending members including spaced cross ties 34. Top and bottom cover plates 35 and 35a join sills 33, bottom cover plate 35a being eliminated between adjacent cross ties 34, to form a bolster receiving recess therebetween. To provide relative lateral motion between truck and underframe, a laterally movable bolster 36 is located in the space between cross ties 34. Bolster 36 is formed with a cylindrical center plate 37 which is in pivotal and load-supporting engagement with truck center plate 30.

In the preferred form of the invention shown in Figure 3 bolster 36 is provided at its ends with extended ears 38 from which at 39 are pivotally suspended swing hangers 40. At their lower ends hangers 40 are pivotally connected as at 41 to brackets 42 extending inwardly and downwardly from sills 33 so as to support sills 33 and underframe U from the bolster 36 for lateral movement relative thereto. For restricting bolster 36 to movements transversely of the underframe in order to transmit longitudinal forces from the truck to the underframe, cooperating chafing plates 43 and 44 are provided on the adjacent walls of the bolster and cross ties, respectively. For restraining excessive lateral movements of the bolster relative to the underframe stops 45 are secured to the underframe sills in alignment with end surfaces of hanger supporting ears 38.

Part of the body load is transmitted to the truck through non-yielding cylindrical bearing elements 48, which are secured to underframe U in vertical registry with load supports 31, and which are received on the latter for slidable movement relative thereto responsive to swiveling movements of the truck about the center plate.

For preventing vertical separation between the body and truck, without hindering normal truck movements relative to the body, laterally extending pins 49, each carried by a pair of laterally spaced upstanding projections on each wheelpiece 22, pass through the opening in longitudinally extending U-shaped members 49a, the terminals of which are secured to the underframe. These devices are in transverse alignment with the center plate.

It will be seen that during operation the underframe U will be free to move laterally relative to the bolster 36 and the truck, but that horizontal surfaces of the bolster and truck center plates will at all times remain parallel because of the vertical arrangement of the swing hangers 40. Thus even though the body move the maximum distance laterally as permitted by the stops 45, there will be no tendency for the bolster and truck center plates, to become partly disengaged as would be the case if the bolster were permitted to tilt transversely of the truck and underframe.

In the second form of the invention, shown in Figure 5, the arrangements of the parts is generally similar to that shown in Figures 1 to 4, and the same description of the structure is applicable, except where differences exist as indicated below. In this embodiment, the hangers 50 are inclined in the usual manner in order to provide variable resistance against forces tending to move the underframe laterally with respect to the truck. To compensate for the tilting of the bolster which occurred during lateral displacement because of the inclination of the hangers, a spherical center plate structure is provided, the convex portion 52 on the bolster engaging the concave portion 53 on the truck frame, so that as the bolster tilts during lateral displacement, even though the truck frame is retained parallel to the underframe by means of the loading pads 31 and cooperating elements 48, the bolster portion of the center plate merely rotates about a horizontal axis within the truck portion and no separation occurs.

Figures 6, 8:
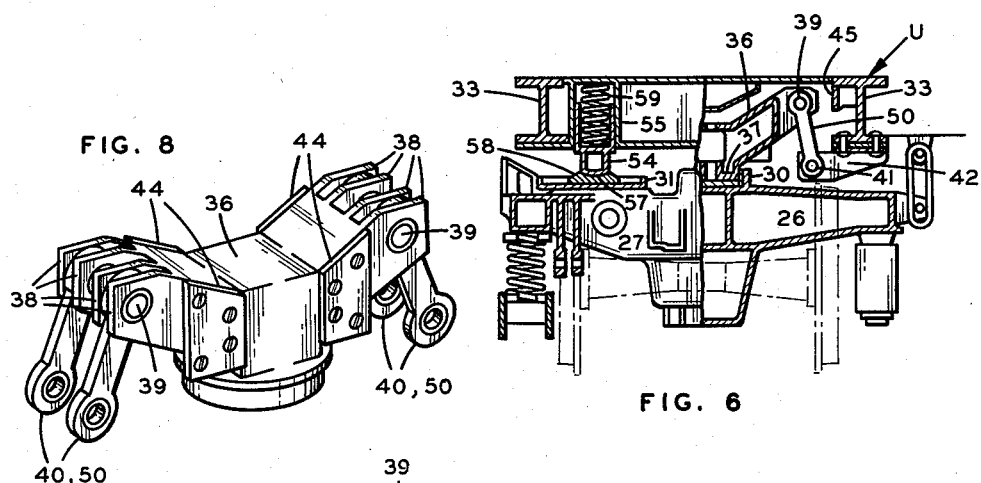
Figure 6 is a transverse vertical section taken approximately on the line 3—3 of Figure 1, but illustrating a third embodiment of the invention.
Figure 8 is a perspective view of the bolster and associated swing hangers.

A third form of the invention is shown in Figure 6 in which the hanger and bolster construction is similar to Figure 5 except that the usual cylindrical center plate is provided. To compensate for the tilting of the bolster and prevent separation at any of the three load supports, the underframe elements engageable with load supports 31 consist of a plunger 54 arranged for vertical movement in a cylindrical housing 55 embodied in the underframe. The lower end surface 57 of plunger 54 is of spherical form and engages a mating spherical surface on bearing shoe 58 which in turn slidably rests on loading pad 31. Coil spring 59 in housing 55 constantly urges plunger 54 downwardly so that bearing shoes 58 are always in slidable engagement with loading pads 31, any angularity between the truck and underframe resulting from tilting of the bolster being accommodated by means of the spherical connection between plungers 54 and shoes 58.

Figure 7:
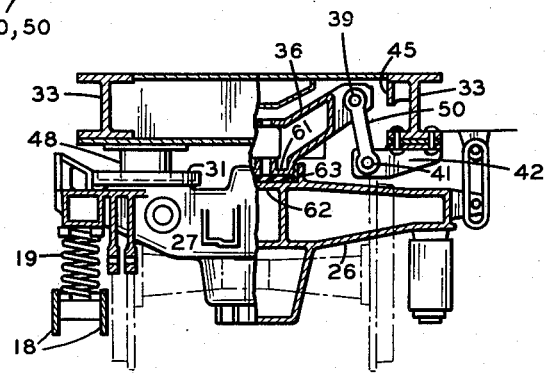
Figure 7 is a vertical transverse section taken approximately on the line 3—3 of Figure 1, but illustrating a fourth embodiment of the invention.

Figure 7 shows a fourth form of the invention in which inclined hangers 50 and non-yieldable underframe support members 48 are provided. In this form tilting of the bolster is accommodated by the interposition of a relatively thick pad 63 of rubber or rubber-like material between the flat horizontal surfaces of cylindrical center plate halves 61 and 62, the pad being adapted to yield vertically only responsive to angularity between the center plate halves. When angularity occurs at the center plate, due to tilting of the bolster relative to the body (which is restrained against tilting by the non-yieldable underframe support members 46), rubber pad 63, though rendered substantially non-yieldable in compression by the application of the body load, will flow from the shallow space between the center plate halves at one side to the relatively deep space at the other side, thus effectively transmitting the load through the entire horizontal area of the center plate when tilted as well as when the surfaces are parallel.

The details of the structures may be varied substantially without departing from the spirit of the invention and the exclusive use of those modifications coming within the scope of the appended claims is contemplated.

I claim:

1. In a railway vehicle, a truck comprising wheel and axle assemblies and a frame supported thereon, said frame having a pair of upwardly-facing horizontal bearings rigid therewith opposite each other transversely of the truck and laterally-spaced from each other on opposite sides of the longitudinal axis of the truck, a vehicle body having rigid downwardly-facing bearing elements in horizontally-slidable engagement with said bearings, a center plate rigid with said frame on the longitudinal axis of said truck and spaced longitudinally of said truck from said bearings, said center plate having an upright cylindrical surface and an upwardly-facing surface, a bolster having a rigid center plate having an upright cylindrical surface in mating engagement with said first-named cylindrical surface and a downwardly-facing surface in load-supporting engagement with said upwardly-facing surface, transversely-swingable hangers depending from the end portions of said bolster and pivotally connected at their lower ends to said vehicle body, said hangers being normally vertically disposed whereby said bolster and said body are maintained parallel transversely of the vehicle throughout the range of lateral movement therebetween.

2. A railway vehicle according to claim 1 in which said vehicle body includes transversely spaced longitudinally extending and longitudinally-spaced transversely-extending underframe elements forming a downwardly open recess, and said bolster is received in said recess.

3. A railway vehicle according to claim 2 in which said transversely-extending underframe elements have vertical surfaces opposing and slidably engaging corresponding surfaces on said bolster for preventing movement of said bolster longitudinally of the vehicle body while accommodating transverse movement therebetween.

References Cited in the file of this patent

UNITED STATES PATENTS

| | | |
|---|---|---|
| 975,303 | Vauclain | Nov. 8, 1910 |
| 2,268,267 | Sheesley | Dec. 30, 1941 |
| 2,424,001 | Sheesley | July 15, 1947 |
| 2,703,057 | Wintemberg | Mar. 1, 1955 |
| 2,705,924 | Travilla et al. | Apr. 12, 1955 |
| 2,780,179 | Long | Feb. 5, 1957 |
| 2,797,650 | Ross et al. | July 2, 1957 |